No. 704,338. Patented July 8, 1902.
J. D. IHLDER.
CONTROLLING SYSTEM FOR ELECTRIC ELEVATORS.
(Application filed Jan. 13, 1902.)
(No Model.)
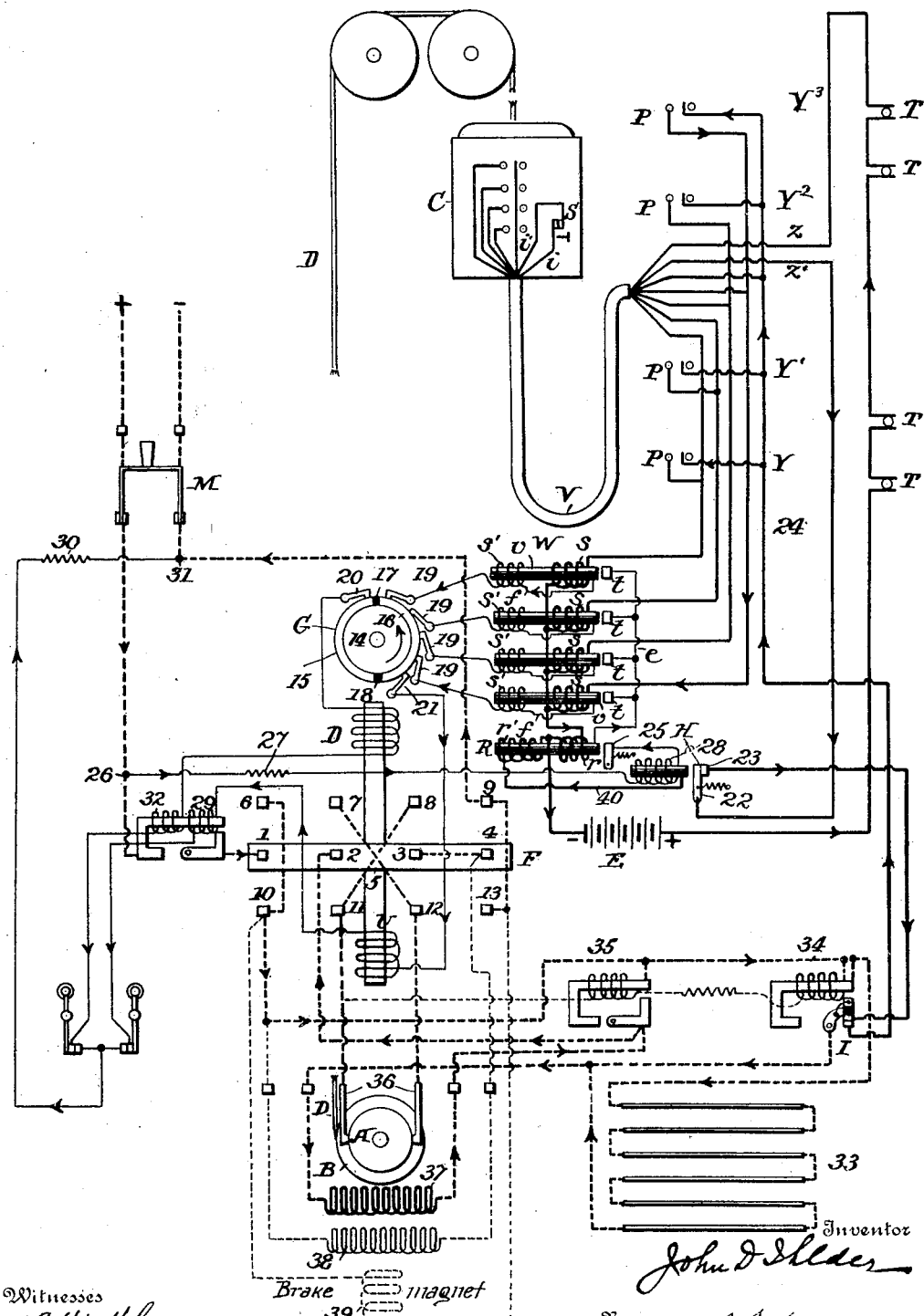
Witnesses
Inventor
John D Ihlder
By Foster Freeman
Attorneys

UNITED STATES PATENT OFFICE.

JOHN D. IHLDER, OF YONKERS, NEW YORK, ASSIGNOR TO OTIS ELEVATOR COMPANY, OF EAST ORANGE, NEW JERSEY, A CORPORATION OF NEW JERSEY.

CONTROLLING SYSTEM FOR ELECTRIC ELEVATORS.

SPECIFICATION forming part of Letters Patent No. 704,338, dated July 8, 1902.

Application filed January 13, 1902. Serial No. 89,551. (No model.)

*To all whom it may concern:*

Be it known that I, JOHN D. IHLDER, a citizen of the United States, residing at Yonkers, in the county of Westchester and State of New York, have invented certain new and useful Improvements in Controlling Systems for Electric Elevators, of which the following is a specification.

My invention has reference in general to the operation of machinery, but more particularly to its operation by electric power.

While my invention is applicable to many classes of apparatus, it is particularly applicable to elevators operated by electric motors in which a controlling-circuit for the motor is led to the several floors or stations and to the car; and my invention has for its object to obviate the necessity of operating with a high potential in the controlling-circuit.

In my pending application, Serial No. 89,341, filed January 11, 1902, an apparatus for controlling motors is disclosed in which there is a controlling-circuit of lower potential than the main motor-circuit and so arranged that after it has once been energized to operate the motor the whole of the low-potential controlling-circuit is rendered inoperative during the operation of the motor, so that if there is provided a source of low potential, as a battery, for energizing the controlling-circuit it is not supplying current during the operation of the motor.

My present invention consists of an apparatus for controlling motors provided with a controlling-circuit of lower potential than the main motor-circuit, but so arranged that after it has once been energized to operate the motor a portion only of said controlling-circuit is automatically rendered inoperative during the operation of the motor, while the remainder of the controlling-circuit is maintained in an operative condition, for reasons hereinafter to appear, and is drawing current from its source of supply except when the motor is at rest and the controlling-circuit broken.

My invention further comprises the apparatus and arrangement of circuits hereinafter more fully described and shown in the accompanying specification and drawing, in which the figure is a diagrammatic representation of circuits and apparatus embodying my invention.

While my invention is applicable to motors in general, I have shown it in connection with a motor operating an elevator, and, referring to the drawing, A represents a suitable motor (shown in this instance as an electric motor) driving a sheave B, connected to operate a car or cage C by a suitable cable D. (Shown in part broken away for the sake of clearness.)

Y Y' Y$^2$ Y$^3$ represent floors or stations, of which there may be any number, four being shown in this instance, and means are provided at the stations, as they may also be provided on the car, so connected with the motor that its operation is controllable from a floor or station or from the car.

The particular motor-controlling apparatus shown and to be described operates upon the same general principles as the apparatus shown and described in my previous application, Serial No. 660,873, filed December 6, 1897, wherein the manipulation of a switch or push-button at a station or a corresponding push-button on the car will set the motor in operation to bring the car to the floor corresponding to the switch or push-buttons manipulated, where it will be automatically stopped, while interference with the operation of the motor from any other floor is prevented until the car reaches its destination. I am not to be understood, however, as limiting my invention to this particular controlling apparatus for motors, but have shown it in the connection described as illustrative of one of its many applications.

In controlling apparatus for elevators of the class described it is customary to lead the controlling-circuit to the floors or stations as a shunt from the supply-line, in which case the electric potential of the controlling-circuit is substantially the same as that of the line, and with motors operating on high-potential circuits it is obviously undesirable that the controlling-circuit should be of this high potential, and connections have been devised for providing a controlling-circuit of much lower potential than the main line.

The controlling-circuit leading to the floors or stations may be derived from any suitable source of the desired low potential; but in this instance the controlling-circuit is shown deriving its energy from a separate source from the main circuit, as a battery E, of lower potential than the mains, which are indicated by the + and − signs. According to my invention the low-potential circuit is first energized by the operation of a push-button or switch at a station or on the car and the motor is started to bring the car to the desired station; but during the operation of the motor that portion of the low-potential controlling-circuit including the push-button or switch manipulated, as well as those at the other stations and on the car, is deënergized or out of circuit, while the remainder of the controlling-circuit, including a safety-switch on the car and also other switches at the stations, as door-switches, is maintained energized.

In the drawing the low-potential controlling-circuit leading to the floors or stations and to the car is represented by continuous heavy lines, while the main motor-circuit is represented by heavy dotted lines, and the continuous light lines represent other controlling-circuits for the motor connected to a suitable floor-controller for automatically stopping the car or cage at the desired station and also including electroreceptive devices, as solenoids, for operating a reversing-switch for the motor.

A suitable reversing-switch is represented diagrammatically at F, there being contacts 1 2 3 4, (shown as connected to and insulated from a suitable armature 5,) adapted to be moved to one side or the other of its central position and bring its contacts either against the contacts 6 7 8 9 or 10, 11, 12, and 13, thereby reversing the direction of current through the armature-circuit according to the movement of the armature 5.

The floor-controller G or automatic means for stopping the motor when the car has arrived at its destination is of any suitable character, but is preferably of the kind shown and described in my former application referred to, Serial No. 660,873, in which there is a drum 14, adapted to be rotated by the motor in any suitable manner in unison with the travel of the car. Upon the periphery of the drum 14 are arranged segments 15 16, insulated from each other at 17 18 and arranged with contacts 19, bearing thereon, connected in one portion of the controlling-circuit, while contacts 20 and 21 are connected, respectively, to the magnets D and U for operating the reversing-switch F, it being understood that when the magnet D is energized the reversing-switch is caused to complete the armature-circuits in such a manner that the motor will rotate in a direction to cause the car to descend and when the magnet U is energized the motor is caused to rotate in the opposite direction. The circuits of the magnets D U are adapted to be broken at the floor-controller G in a manner hereinafter to be described to stop the car automatically at its desired destination.

Let it be assumed that the car is near the limit of its downward travel and that it is desired to bring it to the top station $Y^3$. The push-button P at the floor $Y^3$ is manipulated to close the controlling-circuit in which it is connected, and assuming that the main switch M is closed, that the door-contacts T, one at each floor, adapted to be operated by the opening and closing of the doors, are also closed, and the safety-switch S on the car closed then a circuit will be completed as follows: from the + terminal of the battery E through door-contacts T by flexible cable V to the safety-switch S on the car and from thence back through the flexible cable V to a suitable normally-closed switch H through the pivoted armature 22 of the same and contact 23 to and through the normally closed contacts of a switch I, from thence by a wire 24 to one side of all the push-buttons or switches P, connected in parallel to each other and to those on the car and to the button manipulated, from thence through a solenoid $s$ of one of a series of doubly-wound electromagnets W and the winding $r$ of the doubly-wound electromagnet R, and from thence back to the negative terminal of the battery E.

It is to be understood that each push-button or switch P at the stations corresponds to a solenoid $s$ of a magnet W and the push-buttons Q on the car correspond to the several floors or stations and also correspond each to a solenoid $s$, so that according to the particular push-button at the station or on the car operated a particular solenoid $s$ will be energized.

The solenoid $s$, corresponding to the push-button P at the station $Y^3$, having been energized as described, a corresponding contact $t$ will be moved into contact with the core $v$ of the solenoid $s$, while at the same time the energizing of the winding $r$ on the electromagnet R will attract the contact 25, thereby closing a controlling-circuit shown derived in shunt from the main line as follows: From the point 26 on the positive lead circuit passes through a suitable resistance 27 to and through an electromagnet 28, from thence through the contact 25 to the core of the doubly-wound electromagnet R, and from thence by a wire $e$, connected to said core, to the contact $t$, which has been attracted to the core $v$, and from thence by a wire $f$ through a winding $s'$ on the core $v$, and from thence to brush or contact 19, bearing upon the segment 16 of the floor-controller G. From the brush 19 of the floor-controller current passes by one or the other of the brushes or contacts 20 21, according to which one is in contact on the same segment upon which the brush 19 referred to bears. In this instance the current will pass by contact 21 to the magnet U, from thence to an electromagnet 29 and to the negative main through a suitable resistance 30 at the point 31. The magnet U, having been energized, will close the reversing-switch F at the same time that the electromagnet 29 closes the circuit of the motor, so that the motor will rotate in a direction to move the car upward. It being assumed that the drum 14 of the floor-controller G will rotate in the direction of the arrow, then when the insulated portion 17 comes opposite the brush 19, through which current is passing, the circuit of the magnet U will be broken, and the parts are so arranged that this will happen at such time as to break the motor-circuits and stop the car automatically at station $Y^3$.

Should it be desired to call the car downward either from a station or from the car, the desired push-button or switch is manipulated and the magnet D and electromagnet 32 become energized, so that the motor rotates in a direction to move the car downward.

Without tracing through the motor-circuits it will be sufficient to say that 33 represents an armature resistance arranged to be cut out of circuit by degrees by the operation of electromagnets 34 35, connected in a shunt across the armature-brushes 36, the electromagnets 34 35 being so wound as to operate one after the other as the counter electromotive force of the motor increases on starting, it being understood that there may be any desired number of these accelerating-electromagnets cutting out the starting resistance in any number of steps. 37 represents the series field of the motor, which is also cut out of the armature-circuit by the operation of the magnet 35. 38 represents the shunt field-winding, and 39 a magnet adapted to operate a brake for the motor.

By the closure of the circuit of the battery E through the operation of the push-button or switch P at station $Y^3$, as described, it will be seen that the portion of the motor-controlling circuits deriving its energy directly in shunt from the main line is closed at the contacts $t$ and 25, while at the same time a portion of the controlling-circuit of lower potential than the main circuit deriving its energy from the battery E was cut out of circuit by the operation of the electromagnet 28, attracting the armature 22 and breaking the low-potential controlling-circuit at contact 23. The remaining portion of the low-potential controlling-circuit including the door-contacts T and safety-switch S on the car is maintained energized as long as the electromagnet 28 of switch H maintains the armature 22 in contact with its core, for then a circuit may pass from the positive pole of the battery E through the door-contacts T to the safety-switch S on the car, from thence to armature 22 and by wire 40, connected to the core of the electromagnet 28, to and through the winding $r'$ on the doubly-wound magnet R, and from thence to the negative pole of the battery E. As soon as the circuit of the solenoid of one of the magnets W, which was originally energized by the operation of a push-button or switch P, and also the winding $r'$ on the magnet R become energized by the breaking of the low-potential controlling-circuit at contact 23 the function of the windings $s'$ and $r'$ comes into operation, which is to maintain contacts $t$ and 25, respectively, in contact with the cores against which they are attracted, thereby maintaining the controlling-circuit derived from the main line closed until broken at the floor-controller. It will also be seen that by breaking the low-potential controlling-circuit at the safety-switch S on the car the winding $r'$ on the doubly-wound magnet R will be deenergized, thereby releasing the contact 25 and breaking the derived controlling-circuit or high-potential controlling-circuit and bringing the motor to a stop; but in any event it will be seen that the battery E is constantly in circuit and is never entirely cut out of circuit during the operation of the motor.

Without limiting myself to the precise construction and arrangement of parts shown and described, I claim as my invention—

1. The combination with an electric motor, and its main circuit, of a controlling-circuit of lower potential than the main circuit, and means for rendering a portion of said controlling-circuit inoperative after the motor is started, substantially as described.

2. In an electric controlling system for elevators, the combination with a motor and car, of a main motor-circuit, a controlling-circuit of lower potential than the main circuit, and means for energizing the controlling-circuit to start the car and for then rendering said circuit in part inoperative, substantially as described.

3. The combination with an electric motor, and its main circuit, of a controlling-circuit of lower potential than the main circuit, and means for rendering a portion of said controlling-circuit temporarily inoperative after the motor is started, substantially as described.

4. The combination with an electric motor, and its main circuit, of a controlling-circuit of lower potential than the main circuit, and means for maintaining a portion of said controlling-circuit inoperative while the motor is in operation, substantially as described.

5. The combination with an electric motor, and its main circuit, of a controlling-circuit of lower potential than the main circuit, and means for cutting out a portion of said controlling-circuit as the motor starts, substantially as described.

6. In an electrical controlling system for elevators, the combination with a motor, car, and stations, of a main circuit for the motor, a controlling-circuit of lower potential than the main circuit, and means for rendering a portion of said controlling-circuit inoperative when the motor starts, substantially as described.

7. In an electrical controlling system for elevators, the combination with a motor, car and stations, of a main circuit for the motor, a controlling-circuit of lower potential than the main circuit, and means for rendering a portion of said controlling-circuit inoperative after said circuit has once been energized, substantially as described.

8. In an electrical controlling system for elevators, the combination with a motor, car, and stations, of a main circuit for the motor, a controlling-circuit of lower potential than the main circuit, means at the stations included in said controlling-circuit for controlling the starting of the motor, and means for rendering a portion of said controlling-circuit inoperative after the motor has started, substantially as described.

9. In an electrical controlling system for elevators, the combination with a motor, and its main circuit, of means for controlling the starting of the motor included in a circuit of lower potential than the main circuit, and means for cutting out that portion of the low-potential circuit including the means for controlling the starting of the motor as the motor starts, substantially as described.

10. In an electrical controlling system for elevators, the combination with a motor, car, stations, and main circuit of the motor, of means included in a circuit of lower potential than the main circuit for starting the car to a particular station, and means for rendering that portion of the low-potential circuit which contains the means for starting the car inoperative after having started the car, substantially as described.

11. In an electrical controlling system for elevators, the combination with a motor, its main circuit, controlling devices, and circuits therefor, of means included in a circuit of lower potential than the main circuit for controlling said controlling devices, and means for rendering a portion of said controlling-circuit inoperative after said controlling devices have been operated, substantially as described.

12. In an electrical controlling system for elevators, the combination with a motor, its main circuit, controlling devices, and circuits therefor, of means included in a circuit of lower potential than the main circuit for controlling said controlling devices, and means for rendering a portion of said controlling-circuit inoperative after it has once been energized, substantially as described.

13. In the electrical controlling system for elevators, the combination with a motor, its main circuit, controlling devices, and circuits therefor, of means included in a circuit of lower potential than the main circuit for controlling said controlling devices, and means for rendering a portion of said controlling-circuit inoperative after it has once been energized while maintaining the remainder energized, substantially as described.

14. In an electrical controlling system for elevators, the combination with a motor, and its main circuit, of motor-controlling devices and circuits therefor, a circuit of lower potential than the main circuit for controlling the operation of said controlling devices and their circuits and means for rendering a portion of said controlling-circuit inoperative after said controlling devices have been operated, substantially as described.

15. In an electrical controlling system for elevators, the combination with a motor, and its main circuit, of controlling devices and circuits therefor, operative means included in a circuit of lower potential than the main circuit for controlling the operation of said controlling devices and their circuits, and means for cutting out a portion of the low-potential circuit as the motor starts, substantially as described.

16. In an electrical controlling system for elevators, the combination with a motor, and its main circuit, of motor-controlling devices and circuits for the same derived from the main circuit, a circuit of lower potential than said main circuit derived from a separate source of power for controlling the operation of said controlling devices and their circuits, and means for cutting out a portion of said controlling-circuit when the motor-controlling devices are operated, substantially as described.

17. In an electrical controlling system for elevators, the combination with a motor, and its main circuit, of motor-controlling devices with circuits for the same derived from said main circuit, means for controlling said devices and their circuits included in a circuit derived from a separate source of lower potential than said main circuit, and means for rendering a portion of said low-potential circuit inoperative when the motor-controlling devices are operated, substantially as described.

18. In an electrical controlling system for elevators, the combination with a motor, and its main circuit, of motor-controlling devices with circuits for the same derived from said main circuit, means for controlling said devices and their circuits included in a circuit derived from a separate source of lower potential than said main circuit, and means for rendering a portion of said low-potential circuit inoperative when the motor-controlling devices are operated while maintaining the remainder of said low-potential circuit operative, substantially as described.

19. In an apparatus for controlling elevators, the combination with a motor, car, and stations, of switches corresponding to the floors and stations, circuits and connections of high and low potential including the switches and the motor for controlling the operation of the motor, and means for rendering a portion of the circuits of low potential inoperative as the motor starts, substantially as described.

20. In an apparatus for controlling elevators, the combination with a motor, car, and stations, of switches corresponding to the floors and stations, circuits and connections of high and low potential including the switches and the motor for controlling the operation of the motor, and means for cutting out a portion of the low-potential circuits after the car has started, substantially as described.

21. In an apparatus for controlling elevators, the combination with a motor, car, and stations, of switches corresponding to the floors and stations, circuits and connections of high and low potential including the switches and the motor for controlling the operation of the motor, and means for cutting out a portion of the low-potential circuits after the car has started while maintaining the remainder operative, substantially as described.

22. In an apparatus for controlling elevators, the combination with a motor, car, and stations, of a main circuit for the motor, switches, circuits and connections including the switches and the motor for controlling the operation of the motor, the portion of said circuits including the switches being of lower potential than said main circuit, and means for automatically cutting out a portion of said circuit of lower potential when one of the switches is operated, substantially as described.

23. In an apparatus for controlling elevators, the combination with a motor, car, and stations, of a main circuit for the motor, switches on the car, circuits and connections including the switches and the motor for controlling the operation of the motor, the portion of said circuits including the switches being of lower potential than said main circuit, and means for automatically cutting out a portion of said circuit of lower potential when one of the switches is operated, substantially as described.

24. In an apparatus for controlling elevators, the combination with a motor, car, and stations, of a main circuit for the motor, switches at the stations, circuits and connections including the switches and the motor for controlling the operation of the motor, the portion of said circuits including the switches being of lower potential than said main circuit, and means for automatically cutting out a portion of said circuit of lower potential when one of the switches is operated, substantially as described.

25. In an apparatus for controlling elevators, the combination with a motor, car, and stations, of a main circuit for the motor, switches, circuits, and connections including the switches and the motor for controlling the operation of the motor, the portion of said circuits including the switches being of lower potential than said main circuit, and means for rendering a portion of the circuit of lower potential inoperative after the motor has started while maintaining the remainder of said low-potential circuit operative, substantially as described.

26. In an apparatus for controlling elevators, the combination with a motor, car, and stations, of a main circuit for the motor, switches on the car, circuits and connections including the switches and the motor for controlling the operation of the motor the portion of said circuits including the switches being of lower potential than said main circuit, and means for rendering a portion of the circuit of lower potential inoperative after the motor has started while maintaining the remainder of said low-potential circuit operative, substantially as described.

27. In an apparatus for controlling elevators, the combination with a motor, car, and stations, of a main circuit for the motor, switches at the stations, circuits and connections including the switches and the motor for controlling the operation of the motor, the portion of said circuits including the switches being of lower potential than said main circuit, and means for rendering a portion of the circuit of lower potential inoperative after the motor has started while maintaining the remainder of said low-potential circuit operative, substantially as described.

28. In an apparatus for controlling elevators, the combination with a motor, car, and stations, of push-buttons for each station and a circuit including the same, motor-controlling devices and a circuit including the same, means in the push-button circuit for closing the circuit of the motor-controlling devices when a push-button is manipulated, and means in said latter circuit for opening a portion of the push-button circuit including the push-buttons while maintaining another portion of said circuit closed, substantially as described.

29. In an apparatus for controlling elevators, the combination with a motor, car, and stations, of push-buttons for each station and a circuit including the same, motor-controlling devices and a circuit including the same, means in the push-button circuit for closing the circuit of the motor-controlling devices when a push-button is manipulated, and means in said latter circuit for opening a portion of the push-button circuit including the push-buttons and closing a shorter circuit around the same, substantially as described.

30. In an apparatus for controlling elevators, the combination with a motor, car, and stations, of push-buttons for each station and a circuit including the same, motor-controlling devices and a circuit including the same, means in the push-button circuit for closing the circuit of the motor-controlling devices when a push-button is manipulated, means in said latter circuit for opening a portion of the push-button circuit including the push-buttons and closing a shorter circuit around the same, and means in said shorter circuit for maintaining the circuit of the motor-controlling devices closed, substantially as described.

31. In an apparatus for controlling elevators, the combination with a motor, car, and stations, of push-buttons on the car and at the stations, a circuit including the same, motor-controlling devices and a circuit including the same, means in the push-button circuit for closing the circuit of the motor-controlling devices when a push-button is manipulated, and means in said latter circuit for opening a portion of the push-button circuit including the push-buttons while maintaining another portion of said circuit closed.

32. In an apparatus for controlling elevators, the combination with a motor, car, and stations, of push-buttons on the car and at the stations and a circuit including the same, motor-controlling devices and a circuit including the same, means in the push-button circuit for closing the circuit of the motor-controlling devices when a push-button is manipulated, and means in said latter circuit for opening a portion of the push-button circuit including the push-buttons and closing a shorter circuit around the same, substantially as described.

33. In an apparatus for controlling elevators, the combination with a motor, car, and stations, of push-buttons on the car and at the stations and a circuit including the same, motor-controlling devices and a circuit including the same, means in the push-button circuit for closing the circuit of the motor-controlling devices when a push-button is manipulated, means in said latter circuit for opening a portion of the push-button circuit including the push-buttons and closing a shorter circuit around the same, and means in said short circuit for maintaining the circuit of the motor-controlling devices closed, substantially as described.

34. In an apparatus for controlling elevators, the combination with a motor, car, and stations, of push-buttons for each station and a circuit including the same, and motor-controlling devices and a circuit including the same, electromagnets in the push-button circuit for closing the circuit of the motor-controlling devices when a push-button is manipulated an electromagnet in said latter circuit for closing a short circuit around the push-buttons and said magnets when the push-button circuit is opened, a magnet in said shorter circuit for maintaining the circuit of the motor-controlling devices closed, and other magnets in the circuit of the motor-controlling devices for maintaining the circuit of the same closed, substantially as described.

35. In an apparatus for controlling elevators, the combination with a motor, car, and stations, of motor-controlling devices and a circuit including the same, push-buttons for each station and a circuit including the same of lower potential than the circuit including the motor-controlling devices, means in the push-button circuit for closing the circuit of the motor-controlling devices when a push-button is manipulated, and means in the latter circuit for opening a portion of the push-button circuit including the push-buttons and maintaining another portion of said circuit closed, substantially as described.

36. In an apparatus for controlling elevators, the combination with a motor, car, and stations, of motor-controlling devices and a circuit including the same, push-buttons for each station and a circuit including the same of lower potential than the circuit including the motor-controlling devices, means in the push-button circuit for closing the circuit of the motor-controlling devices when a push-button is manipulated, and means in said latter circuit for opening a portion of the push-button circuit including the push-buttons and closing a shorter circuit around the same, substantially as described.

37. In an apparatus for controlling elevators, the combination with a motor, car, and stations, of motor-controlling devices and a circuit including the same, push-buttons for each station and a circuit including the same of lower potential than the circuit including the motor-controlling devices, means in the push-button circuit for closing the circuit of the motor-controlling devices when a push-button is manipulated, means in said latter circuit for opening a portion of the push-button circuit including the push-buttons and closing a shorter circuit around the same, and means in the said shorter circuit for maintaining the circuit of the motor-controlling devices closed, substantially as described.

38. In an apparatus for controlling elevators, the combination with a motor, car, and stations, of motor-controlling devices and a circuit including the same, push-buttons on the car and a circuit including the same of lower potential than the circuit including the motor-controlling devices, means in the push-button circuit for closing the circuit of the motor-controlling devices when a push-button is manipulated, and means in the latter circuit for opening a portion of the push-button circuit including the push-buttons and maintaining another portion of said circuit closed, substantially as described.

39. In an apparatus for controlling elevators, the combination with a motor, car, and stations, of motor-controlling devices and a circuit including the same, push-buttons on the car and a circuit including the same of lower potential than the circuit including the motor-controlling devices, means in the push-button circuit for closing the circuit of the motor-controlling devices when a push-button is manipulated, and means in said latter circuit for opening a portion of the push-button circuit including the push-buttons and closing a shorter circuit around the same, substantially as described.

40. In an apparatus for controlling elevators, the combination with a motor, car, and stations, of motor-controlling devices and a circuit including the same, push-buttons on the car and a circuit including the same of lower potential than the circuit including the motor-controlling devices, means in the push-button circuit for closing the circuit of the motor-controlling devices when a push-button is manipulated, means in said latter circuit for opening a portion of the push-button circuit including the push-buttons and closing a shorter circuit around the same, and means in the said shorter circuit for maintaining the circuit of the motor-controlling devices closed, substantially as described.

41. In an apparatus for controlling elevators, the combination with a motor, car, and stations, of motor-controlling devices and a circuit including the same, push-buttons on the car and at the stations and a circuit including the same of lower potential than the circuit including the motor-controlling devices, means in the push-button circuit for closing the circuit of the motor-controlling devices when a push-button is manipulated, and means in the latter circuit for opening a portion of the push-button circuit including the push-buttons and maintaining another portion of said circuit closed, substantially as described.

42. In an apparatus for controlling elevators, the combination with a motor, car, and stations, of motor-controlling devices and a circuit including the same, push-buttons on the car and at the stations and a circuit including the same of lower potential than the circuit including the motor-controlling devices, means in the push-button circuit for closing the circuit of the motor-controlling devices when a push-button is manipulated, and means in said latter circuit for opening a portion of the push-button circuit including the push-buttons and closing a shorter circuit around the same, substantially as described.

43. In an apparatus for controlling elevators, the combination with a motor, car, and stations, of motor-controlling devices and a circuit including the same, push-buttons on the car and at the stations and a circuit including the same of lower potential than the circuit including the motor-controlling devices, means in the push-button circuit for closing the circuit of the motor-controlling devices when a push-button is manipulated, means in said latter circuit for opening a portion of the push-button circuit including the push-buttons and closing a shorter circuit around the same, and means in the said shorter circuit for maintaining the circuit of the motor-controlling devices closed, substantially as described.

44. In an apparatus for controlling elevators, the combination with a motor, car, and stations, of push-buttons and switches for each station, controlling-circuits and connections between the push-buttons, switches and the motor for operating the motor, the portion of said circuits including the push-buttons and switches being of lower potential than the remainder of the circuits, and means for automatically rendering the push-buttons inoperative while maintaining the switches operative when one of the push-buttons is manipulated, substantially as described.

45. In an apparatus for controlling elevators, the combination with a motor, car, and stations, of push-buttons and switches on the car, controlling-circuits and connections between the push-buttons, switches and the motor for operating the motor, the portion of said circuits including the push-buttons and switches being of lower potential than the remainder of the circuits, and means for automatically rendering the push-buttons inoperative while maintaining the switches operative when one of the push-buttons is manipulated, substantially as described.

46. In an apparatus for controlling elevators, the combination with a motor, car, and stations, of push-buttons and switches on the car and at the stations, controlling-circuits and connections between the push-buttons, switches and the motor for operating the motor, the portion of said circuits including the push-buttons and switches being of lower potential than the remainder of the circuit, and means for automatically rendering the push-buttons inoperative while maintaining the switches operative when one of the push-buttons is manipulated, substantially as described.

In testimony whereof I have signed my name to this specification in the presence of two subscribing witnesses.

JOHN D. IHLDER.

Witnesses:
F. W. NEWELL,
CHARLES B. MANVILLE.